(12) United States Patent
Tezawa

(10) Patent No.: US 12,036,622 B2
(45) Date of Patent: Jul. 16, 2024

(54) SPOT-WELDING ELECTRODE INSPECTION DEVICE

(71) Applicant: KYOKUTOH CO., LTD., Aichi (JP)

(72) Inventor: Kazuhiro Tezawa, Aichi (JP)

(73) Assignee: KYOKUTOH CO., LTD., Aichi (JP)

( * ) Notice: Subject to any disclaimer, the term of this patent is extended or adjusted under 35 U.S.C. 154(b) by 4 days.

(21) Appl. No.: 17/767,903

(22) PCT Filed: Sep. 28, 2020

(86) PCT No.: PCT/JP2020/036552
§ 371 (c)(1),
(2) Date: Apr. 10, 2022

(87) PCT Pub. No.: WO2021/075246
PCT Pub. Date: Apr. 22, 2021

(65) Prior Publication Data
US 2024/0082944 A1    Mar. 14, 2024

(30) Foreign Application Priority Data

Oct. 17, 2019 (JP) ................................. 2019-190391

(51) Int. Cl.
*B23K 11/25* (2006.01)
*B23K 11/11* (2006.01)
*B23K 11/30* (2006.01)

(52) U.S. Cl.
CPC .......... *B23K 11/252* (2013.01); *B23K 11/115* (2013.01); *B23K 11/3063* (2013.01)

(58) Field of Classification Search
CPC . B23K 11/252; B23K 11/115; B23K 11/3063; B23K 11/36; G01N 2021/8887;
(Continued)

(56) References Cited

U.S. PATENT DOCUMENTS 10,056,010 B2 *   8/2018   Salsich ................... G09B 5/02
10,204,406 B2 *   2/2019   Becker ................... B23K 31/00
(Continued)

FOREIGN PATENT DOCUMENTS

EP    2810734 A1    12/2014
GB    2214119 A *   8/1989   ........... B23K 11/115
(Continued)

OTHER PUBLICATIONS

Office Action for corresponding CN Application No. 202080071354.9 dated Feb. 15, 2023, with English translation.
(Continued)

*Primary Examiner* — Mahendra R Patel
(74) *Attorney, Agent, or Firm* — Renner, Otto, Boisselle & Sklar, LLP

(57) ABSTRACT

The spot-welding electrode inspection device is provided with: a camera unit 2 including a camera body 7 for taking an image of a tip-end of a spot-welding electrode 10 having a welding gun G attached thereto; a control unit 3 for controlling the camera unit 2; a camera cable 4 connecting the camera unit 2 and the control unit. The control unit 3 is provided with: a control substrate 32 for processing the image taken by the camera body 7 and determining the condition of the electrode 10 by comparing a processing result of the image and a setting value which is set in advance; and a metal casing 31 housing the control substrate 32. The casing 31 is attached to a base 11 made of a metal material.

4 Claims, 5 Drawing Sheets

(58) Field of Classification Search
CPC ........... G01N 21/8806; G01N 21/8851; G01N 21/95; G01B 11/08
USPC .......................................................... 382/145
See application file for complete search history.

(56) References Cited

U.S. PATENT DOCUMENTS

| | | | | |
|---|---|---|---|---|
| 10,618,129 | B2 * | 4/2020 | Bartlett | B23K 11/3063 |
| 2004/0134888 | A1 * | 7/2004 | Garza | B23K 11/315 |
| | | | | 219/86.25 |
| 2012/0200695 | A1 * | 8/2012 | Yamane | B23K 11/3063 |
| | | | | 348/90 |
| 2014/0333756 | A1 * | 11/2014 | Sogo | B23K 11/115 |
| | | | | 348/90 |
| 2015/0148955 | A1 * | 5/2015 | Chin | B25J 9/162 |
| | | | | 901/41 |
| 2017/0157697 | A1 * | 6/2017 | Yang | B23K 11/115 |
| 2017/0225262 | A1 * | 8/2017 | Sigler | B23K 11/3063 |
| 2018/0064105 | A1 * | 3/2018 | Taylor | A01M 29/12 |
| 2020/0064273 | A1 * | 2/2020 | Jeong | G01N 21/8851 |

FOREIGN PATENT DOCUMENTS

| | | | | |
|---|---|---|---|---|
| JP | H08271236 | A | | 10/1996 |
| JP | 2008-178887 | A | | 8/2008 |
| JP | 2010-051997 | A | | 3/2010 |
| JP | 2010051997 | A | * | 3/2010 |
| JP | 2012187588 | A | * | 10/2012 |
| JP | 2013-158772 | A | | 8/2013 |
| JP | 2013-230506 | A | | 11/2013 |
| JP | 2015030012 | A | * | 2/2015 |
| JP | 2018-171630 | A | | 11/2018 |
| JP | 2018171630 | A | * | 11/2018 |
| JP | 2018-206964 | A | | 12/2018 |
| JP | 2019-502553 | A1 | | 1/2019 |
| WO | WO-9401236 | A1 * | 1/1994 | ........... B23K 11/115 |
| WO | WO-2013114506 | A1 * | 8/2013 | ............. B23K 11/11 |
| WO | WO-2015194748 | A1 * | 12/2015 | ............. B23K 11/30 |
| WO | WO-2018105854 | A1 * | 6/2018 | ............. G01N 21/88 |

OTHER PUBLICATIONS

Extended European Search Report for corresponding EP Application No. 20875859.9 dated Oct. 21, 2022.
Office Action for corresponding CA Patent Application No. 3,154,156 dated Jun. 21, 2023, with English translation.
Office Action for corresponding JP Patent Application No. 2019-190391 dated Jun. 27, 2023, with English translation.
Office Action for corresponding CN Patent Application No. 202080071354.9 dated Aug. 23, 2023, with English translation.
Office Action in corresponding EP Patent Application No. 20875859.9 dated Sep. 15, 2023.
Siemens AG; "SIMATIC PC-Mehr Industrie-PC"; Nov. 1, 2008, XP093044615, Retrieved from the Internet: URL:https://www.all-electronics.de/wp-content/uploads/migrated/document/ 54872/ 781iee0109-siemens-brochure-simatic-industrial-pc-de.pdf (concise explanation of relevance provided in concurrently submitted Office Action in corresponding EP Patent Application No. 20875859.9 dated Sep. 15, 2023, para. 2).
Anonymous; 2016 Syslogic Datentechnik AG; "Assembling Instruction Rear Mounting Kit"; Jan. 1, 2017, XP093044619, Retrieved from the Internet: URL:https://syslogic.com/ProductDocuments/deu/ IPC_MKITCP-2H_Assembling_Instruction_v1 .0.pdf.
International Search Report for corresponding Application No. PCT/JP2020/036552, mailed Nov. 10, 2020.
Written Opinion for corresponding Application No. PCT/JP2020/ 036552, mailed Nov. 10, 2020.

* cited by examiner

SPOT-WELDING ELECTRODE INSPECTION DEVICE

TECHNICAL FIELD

The present invention relates to a spot-welding electrode inspection device used, for example, in automotive production lines.

BACKGROUND ART

In automotive production lines, spot-welding has conventionally been used where a steel plate is welded by causing it to generate heat through resistance by pressing thereagainst an electrode mounted and held on the tip-end of a welding gun, pressurizing it and then, energizing it. The quality of the spot-welding can be stabilized by appropriately managing the current value, the energization time, the pressurizing force and the electrode condition at the time of energization. Among these, if the tip-end of the electrode is a perfect circle and has no undesired substances adhering thereto, the quality of the welding can be made most stable; however, when welding is performed a predetermined number of times, the tip-end becomes worn to become a non-perfect circle or its condition becomes deteriorated because of the adhesion of an oxide layer or the like, and if welding is continuously performed under this condition, the quality of the welded part becomes unstable. Therefore, it is necessary to grind the deteriorated electrode tip-end into an appropriate condition, and it is necessary to appropriately manage the grinding condition. For example, according to Patent Literature 1, the following are provided: a camera body for taking an image of the tip-end of the electrode mounted and held on the welding gun; a control substrate for controlling the camera body; and a casing housing the camera body and the control substrate, and the control substrate processes the image taken by the camera body and determines the condition of the electrode by comparing the processing result of the image with a setting value which is set in advance, whereby the grinding condition of the electrode is managed.

CITATION LIST

Patent Literature

[Patent Literature 1] Japanese Translation of PCT International Application Publication No. JP-T-2019-502553

SUMMARY OF INVENTION

Technical Problem

In automotive production lines, the welding gun as described above is frequently used in a state of being fixed to the arm tip-end of an industrial robot. Therefore, the spot-welding electrode inspection device as in Patent Literature 1 is necessarily disposed around the industrial robot; however, since various kinds of equipment are disposed around the industrial robot and the space that can be used is limited, the spot-welding electrode inspection device is required to be as compact as possible.

To handle this, downsizing of the entire casing housing the camera body and the control substrate is considered; however, merely downsizing the entire casing narrows the space inside the casing and this makes heat readily accumulate, which can adversely affect the control substrate during continuous use.

The present invention is made in view of such circumstances, and an object thereof is to provide a spot-welding electrode inspection device that can be installed even when the space around an industrial robot is narrow and that has high heat-dissipating properties making it less likely to adversely affect the control substrate even during continuous use.

Solution to Problem

To attain the above-mentioned object, the present invention is characterized in that a camera unit including a camera body for taking an image of an electrode and a control unit for controlling the camera body are separate members and separable from each other and that measures are taken to make the control unit easily dissipate heat.

That is, according to a first aspect of the invention, the following are provided: a camera unit including a camera body for taking an image of a tip-end of a spot-welding electrode mounted and held on a welding gun; a control unit for controlling the camera unit; and a camera cable having one end thereof connected to the camera unit and the other end thereof connected to the control unit, and the control unit is provided with: a control substrate for processing the image taken by the camera body and determining the condition of the electrode by comparing a processing result of the image with a setting value which is set in advance; and a metal casing housing the control substrate and attached to a mount member made of a metal material.

According to a second aspect of the invention, in the first aspect of the invention, the control substrate is a single-board computer, and has at least one of a network connection portion connectable with a network cable and capable of transmitting and receiving a signal to and from a personal computer connected through the network cable, a monitor connection portion connectable with a monitor and capable of transmitting a signal to the monitor, and a robot connection portion connectable with an industrial robot to an arm tip-end of which the welding gun is fixed, and capable of transmitting and receiving a signal to and from the robot.

According to a third aspect of the invention, in the first or second aspect of the invention, a pair of the electrodes are provided so as to sandwich the camera unit, the camera unit is provided with: a measurement reference portion where a pair of fixing holes are formed into which tip-end sides of the electrodes are inserted to fix the electrodes, respectively; and a plate-like mirror disposed so as to be inclined with respect to the electrodes between the pair of fixing holes, and having, on both sides, mirror surfaces that reflect the tip-ends of the electrodes in a state of being fixed to the fixing holes, respectively, and a pair of the camera bodies are disposed so that they can take images of the mirror surfaces of the mirror on both sides of the mirror and in a direction orthogonal to a direction in which the fixing holes are juxtaposed.

Advantageous Effects of Invention

According to the first aspect of the invention, since the camera unit is separate from the control unit through the camera cable, it is possible to install only the camera unit around the industrial robot. Consequently, even when the space around the industrial robot is narrow, the electrode inspection device can be installed. Moreover, since the casing housing the control substrate is made of a metal and in contact with the mount member made of a metal material, the heat generated inside the casing is easily transferred to the mount member through the casing. Consequently, heat does not readily accumulate inside the casing, which makes it possible to make the control substrate less likely to be adversely affected even during continuous use.

According to the second aspect of the invention, since the electrode inspection device can be directly connected to the personal computer through the network connection portion, it is made easy to perform, for example, summarization of the determination results of the conditions of the electrodes by the control substrate and the like, or data analysis. Moreover, since the electrode inspection device can be directly connected to the monitor through the monitor connection portion, the determination results of the conditions of the electrodes by the control substrate and the like can be easily displayed on the monitor. Further, since the electrode inspection device can be directly connected to the industrial robot through the robot connection portion, transfer of signals such as an inspection start signal and an inspection end signal between the control substrate and the industrial robot can be directly performed between the control substrate and the industrial robot. That is, in introducing the electrode inspection device in a production line, connection among various devices can be easily made according to the use, which facilitates production line designing.

According to the third aspect of the invention, since the measurement reference portions make fixed the distance from the electrodes by way of the mirror to the camera bodies, the measurement values do not readily vary. Moreover, since the mirror enables the camera bodies to take images of the tip-ends of the electrodes from right in front, tip-end diameters in at least two directions can be measured at one time by processing the taken images by the control substrate. These enable the measurement of the tip-end diameters of the electrodes, that is, the measurement as to whether the tip-ends are perfect circles or not to be performed accurately with no reduction in the operating rate of the production line. Moreover, by the mirror surfaces on both sides of the mirror simultaneously reflecting the tip-ends of the electrodes, images of the tip-ends of the pair of electrodes can be simultaneously taken, so that measurement of the tip-ends of the electrodes can be performed with no reduction in the operating rate of the production line. Further, since the camera bodies are not disposed between the tip-ends of the pair of electrodes and only the mirror is disposed, the distance between the electrodes in the camera unit can be decreased, so that the structure of the camera unit can be made compact.

DESCRIPTION OF EMBODIMENTS

Figure 1:
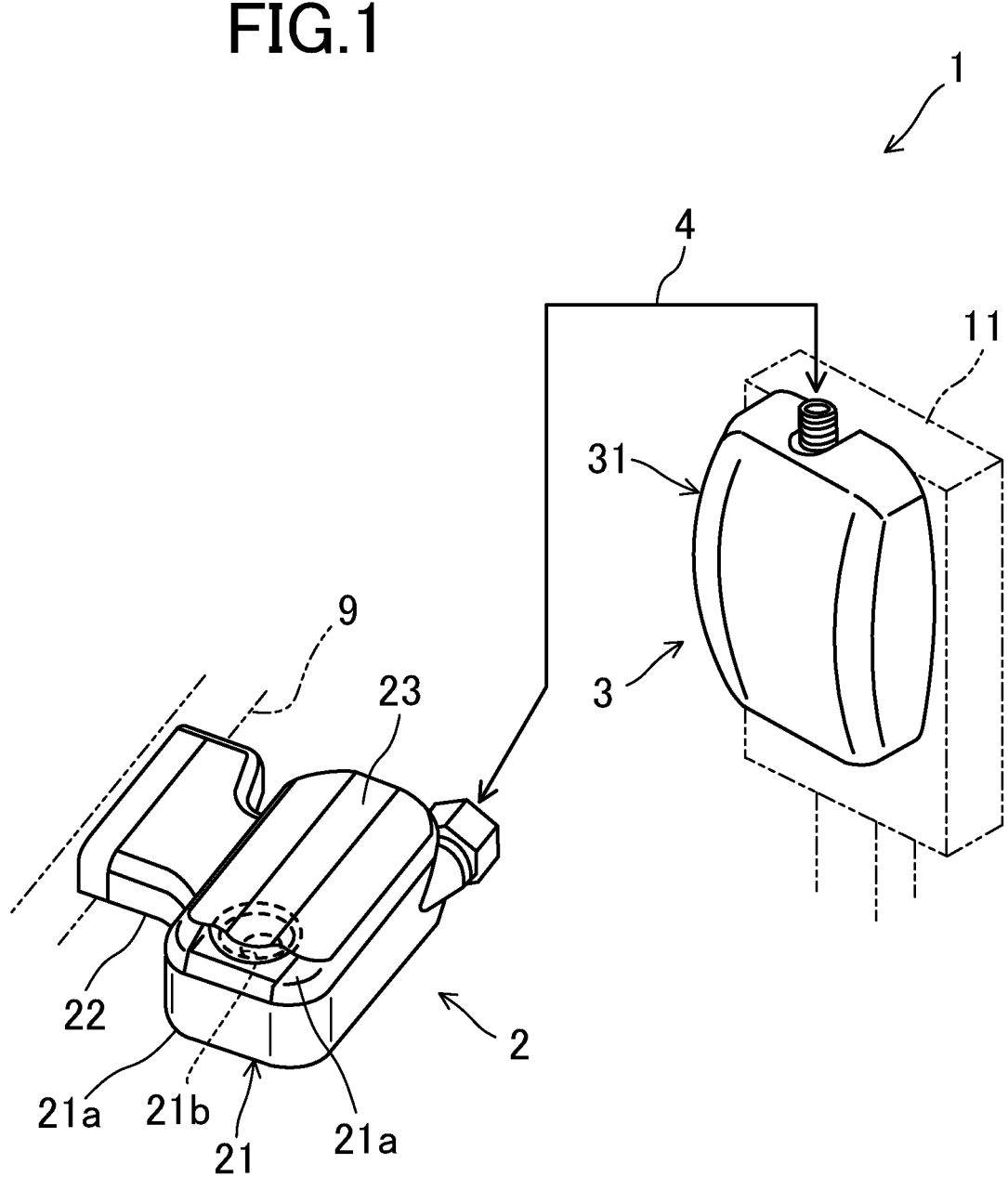
FIG. 1 is a perspective view of a spot-welding electrode inspection device according to an embodiment of the present invention.

Hereinafter, an embodiment of the present invention will be described in detail based on the drawings. The following description of the preferred embodiment is essentially nothing but illustrative.

FIGS. 1 to 4 show a spot-welding electrode inspection device 1 according to the embodiment of the present invention. This electrode inspection device 1 is for inspecting the conditions of a pair of electrodes 10 mounted and held on the shank tip-end of a welding gun G used when a steel plate is welded by spot welding in an automotive production line, and is provided with: a camera unit 2 for taking images of the tip-ends of the electrodes 10; a control unit 3 for controlling the camera unit 2; and a camera cable 4 having one end thereof connected to the camera unit 2 and the other end thereof connected to the control unit 3.

The camera unit 2 is provided with: a housing casing portion 21 having a substantially rectangular parallelepiped shape; and a plate-like bracket portion 22 being substantially L-shaped in plan view and provided on one side surface of the housing casing portion 21, and is attachable to another device 9 by the bracket portion 22.

Figure 4:
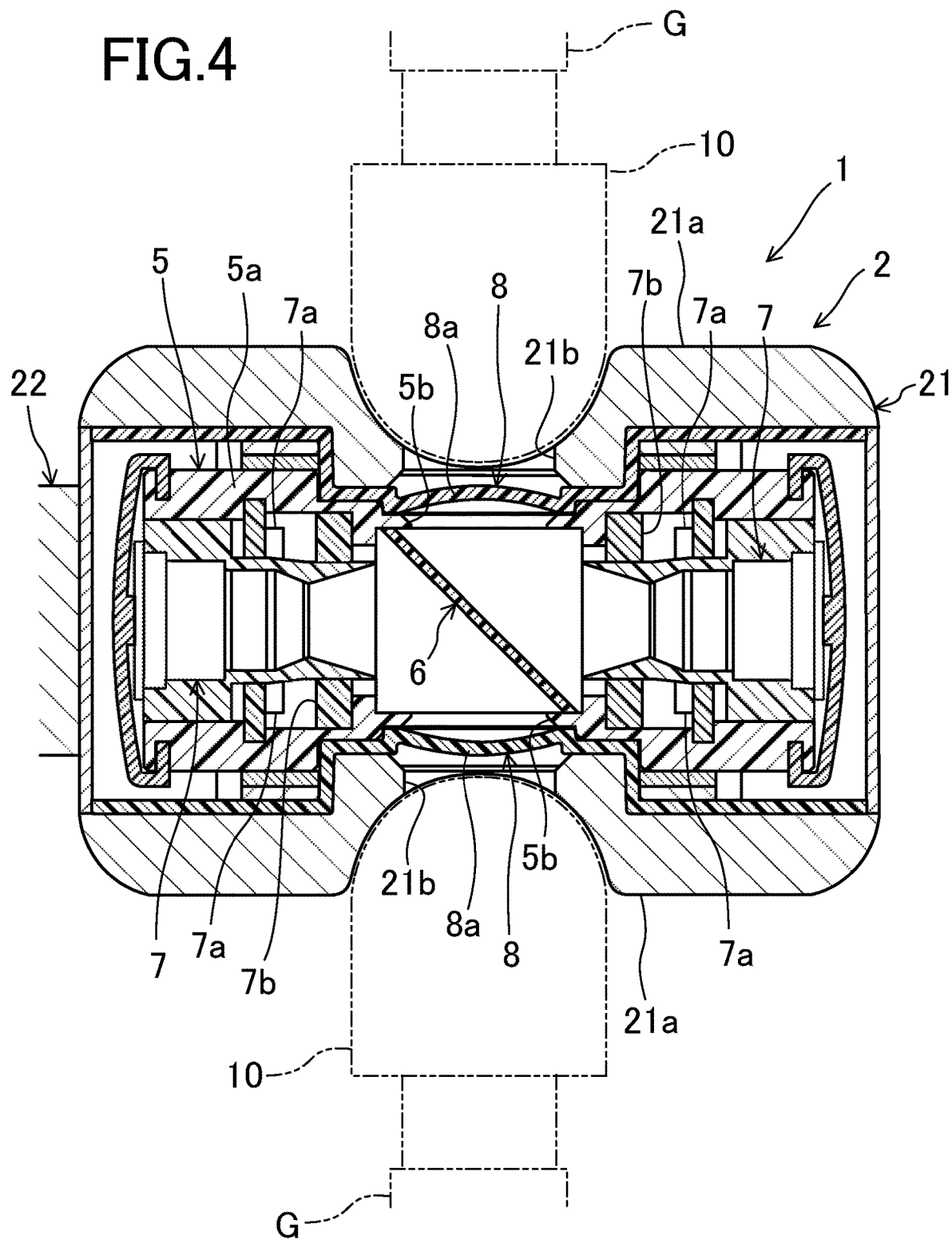
FIG. 4 is a cross-sectional view on line IV-IV of FIG. 2.

On the upper wall and the lower wall on one side of the housing casing portion 21 in the length direction, as shown in FIG. 4, a pair of vertically facing measurement reference portions 21a are provided.

In central parts of the measurement reference portions 21a, fixing holes 21b communicating with the inside of the housing casing portion 21 are formed so as to correspond to each other, the inner peripheral surfaces of the fixing holes 21b have a curved shape that gradually decreases in diameter toward the inside of the housing casing portion 21.

The inner peripheral surfaces of the fixing holes 21b correspond to the shape of the tip-end sides of the electrodes 10, and when the tip-end sides of the electrodes 10 are inserted into the fixing holes 21b, the electrodes 10 are fixed in a state where the central axes of the electrodes 10 coincide with the central lines of the fixing holes 21b.

Between the measurement reference portions 21a inside the housing casing portion 21, as shown in FIG. 4, a mirror module 5 is disposed that extends in the width direction of the housing casing portion 21.

The mirror module 5 is provided with a resin-made module frame 5a forming a skeleton of the mirror module 5, and in the positions of the mirror module 5 corresponding to the fixing holes 21b, openings 5b are formed, respectively.

Between the openings 5b of the module frame 5a, a plate-like mirror 6 is provided that has a mirror surface on each side.

The mirror 6 is disposed so as to be inclined with respect to the electrodes 10 fixed to the fixing holes 21b between the openings 5b, and the mirror surfaces of the mirror 6 reflect the tip-ends of the electrodes 10 in a state of being fixed to the fixing holes 21b, respectively.

In positions near both ends in the length direction inside the module frame 5a, a pair of camera bodies 7 are mounted that take, from right in front, images of the tip-ends of the electrodes 10 reflected on the mirror surfaces of the mirror 6, respectively.

That is, the pair of camera bodies 7 are disposed so that they can take images of the mirror surfaces of the mirror 6 on both sides of the mirror 6 and in a direction orthogonal to the direction in which the fixing holes 21b are juxtaposed.

Around each camera body 7, a plurality of illumination light sources 7a are disposed that illuminate the tip-ends of the electrodes 10 through the mirror surface of the mirror 6.

On the front end sides of the camera bodies 7, diffusion plates 7b made of a milky white resin are disposed, and the diffusion plates 7b improve the unevenness of the light brightness distribution by diffusing the light emitted from the illumination light sources 7a toward the mirror 6.

Further, between the measurement reference portions 21a and the module frame 5a, a transparent-resin-made protection cover 8 is provided that closes the fixing holes 21b to prevent dust and the like from entering the mirror module 5.

In positions corresponding to the fixing holes 21b of the protection cover 8, curved surface portions 8a are provided that are gently curved so that central parts are closer to the electrodes 10 than peripheral parts.

The curved surface portions 8a prevents the light of the illumination light sources 7a reflected at the mirror 6 from being projected onto the lenses of the camera bodies 7 by causing the light to be reflected to the outside of the image-taking ranges of the camera bodies 7, whereby clear images of the tip-end surfaces of the electrodes 10 are taken.

Figure 2:
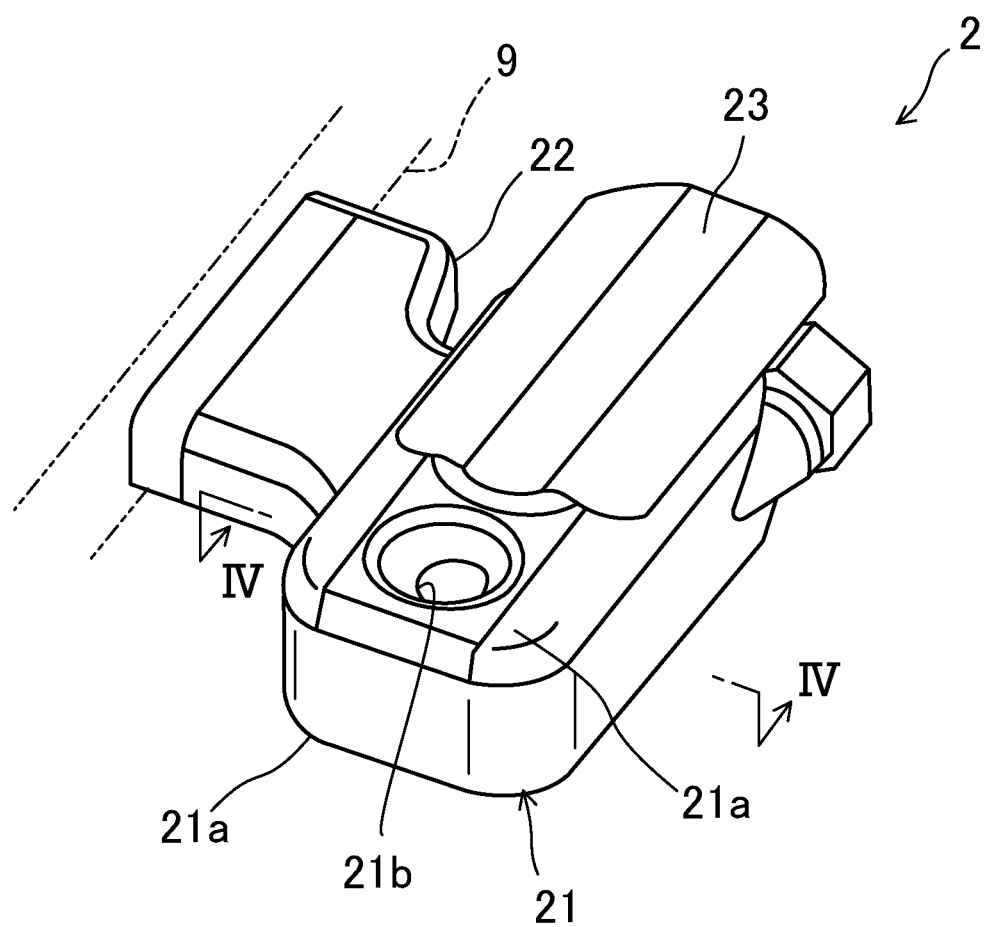
FIG. 2 is a perspective view of a camera unit according to the embodiment of the present invention.

On the upper surface of the housing casing portion 21, as shown in FIGS. 1 and 2, a cover plate 23 is provided that has a shape corresponding to the entire area of the upper surface of the housing casing portion 21.

The cover plate 23 is slidable in the length direction of the housing casing portion 21 with respect to the housing casing portion 21. When slid to one side, as shown in FIG. 1, the cover plate 23 covers the fixing hole 21b to prevent dust and the like from entering the housing casing portion 21 from the fixing hole 21b, and when slid to the other side, as shown in FIG. 2, the cover plate 23 opens the fixing hole 21b to enable the inspection of the electrodes 10.

Figure 3:
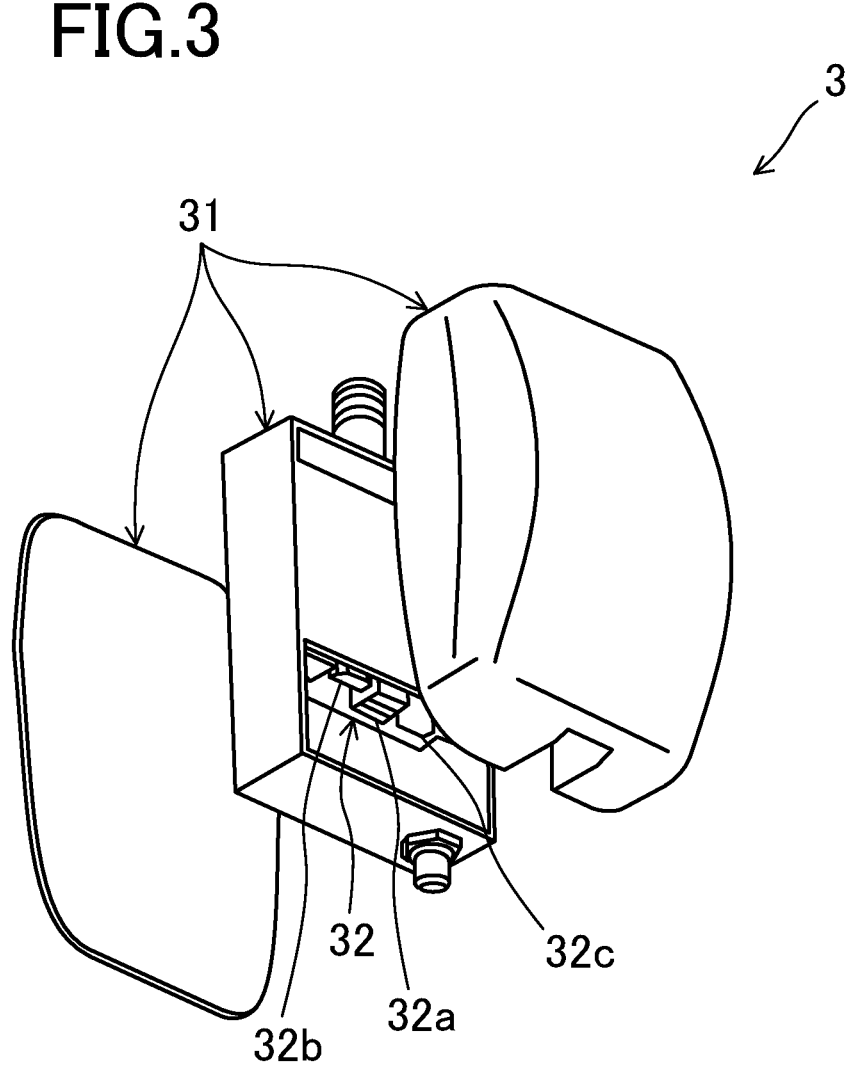
FIG. 3 is an exploded perspective view of a control unit according to the embodiment of the present invention viewed from below.

As shown in FIGS. 1 and 3, the control unit 3 is attached to a base 11 (mount member) that has a flat and substantially plate-like form with a thickness and the entire area of the rear surface of which is made of a metal material, in such a manner as to be in contact with the base 11.

As shown in FIG. 3, the control unit 3 is provided with: a metal casing 31 having a curved shape the front side surface of which gently curves outward; and a control substrate 32 having a substantially rectangular shape and housed in the casing 31.

The control substrate 32 is a single-board computer, imports the images taken by the camera bodies 7 through the camera cable 4, processes them, and determines the conditions of the electrodes 10 by comparing the processing results of the images and a setting value which is set in advance.

Figure 5:
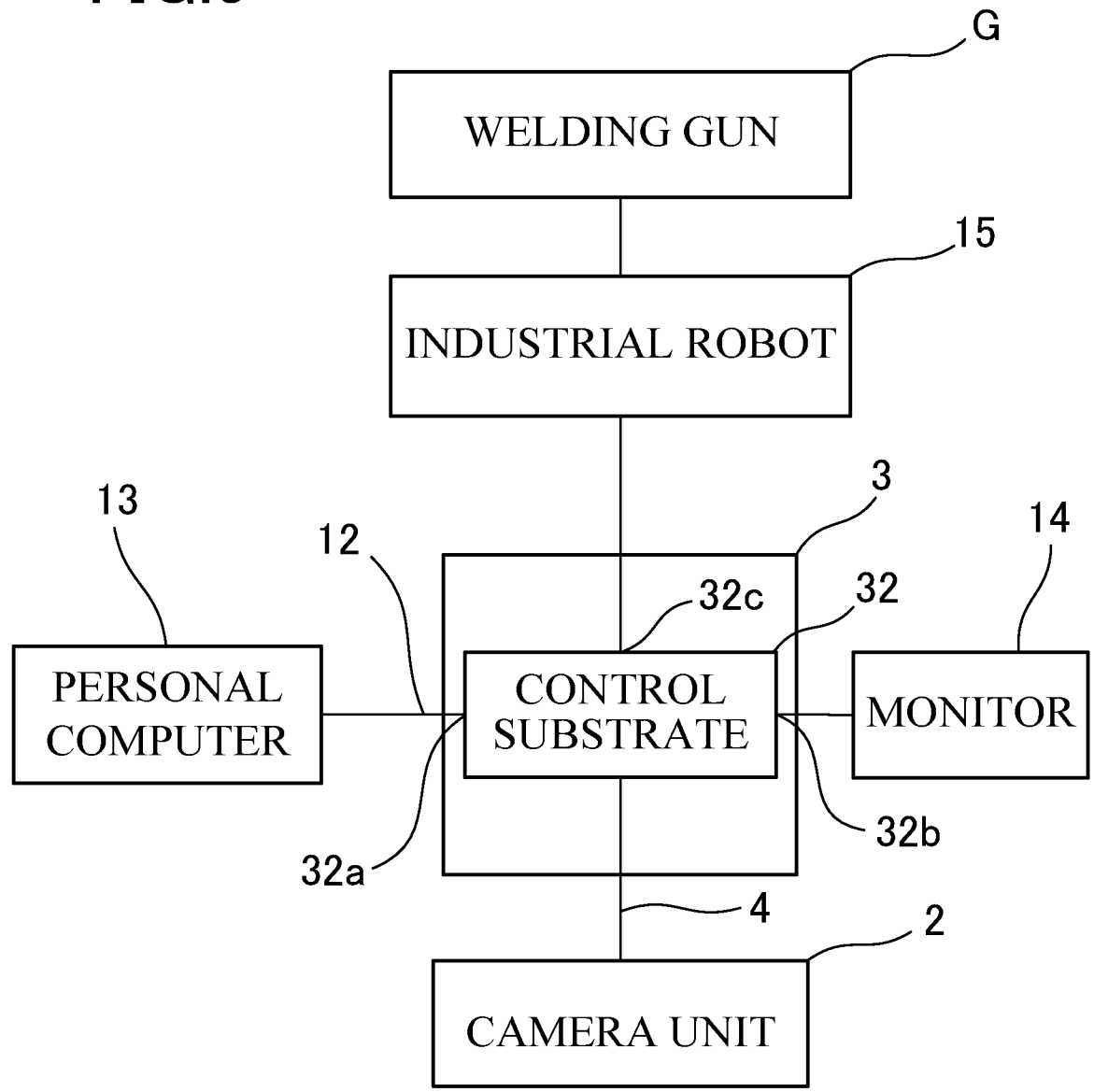
FIG. 5 is a block diagram showing an example of connection of the spot-welding electrode inspection device according to the embodiment of the present invention to other devices.

Moreover, as shown in FIGS. 3 and 5, the control substrate 32 is provided with a network connection portion 32a connectable with a network cable 12, and the network connection portion 32a is capable of transmitting and receiving signals to and from a personal computer 13 connected through the network cable 12.

Further, the control substrate 32 is provided with a monitor connection portion 32b connectable with a monitor 14, and the monitor connection portion 32b is capable of transmitting the images taken by the camera bodies 7 and the processing results of the images to the monitor 14.

In addition, the control substrate 32 is provided with a robot connection portion 32c connectable with an industrial robot 15 to the arm tip-end of which the welding gun G is fixed, and the robot connection portion 32c is capable of transmitting and receiving signals such as a measurement start signal and a measurement end signal to and from the industrial robot 15.

As a concrete method of arithmetic processing of the images taken by the camera bodies 7 and method of determination processing of the conditions of the electrodes 10 by the control substrate 32, the arithmetic processing method and the determination processing method disclosed in Patent Literature 1 are applicable.

From the above, according to the embodiment of the present invention, since the camera unit 2 is separate from the control unit 3 through the camera cable 4, it is possible to install only the camera unit 2 around the industrial robot 15. Consequently, even when the space around the industrial robot 15 is narrow, the electrode inspection device 1 can be installed.

Moreover, since the casing 31 housing the control substrate 32 is made of a metal and in contact with the base 11 made of a metal material, the heat generated inside the casing 31 is easily transferred to the base 11 through the casing 31. Consequently, heat does not readily accumulate inside the casing 31, which makes it possible to make the control substrate 32 less likely to be adversely affected even during continuous use.

Moreover, since the electrode inspection device 1 can be directly connected to the personal computer 13 through the network connection portion 32a, it is made easy to perform, for example, summarization of the determination results of the conditions of the electrodes 10 by the control substrate 32 and the like, or data analysis. Moreover, since the electrode inspection device 1 can be directly connected to the monitor 14 through the monitor connection portion 32b, the determination results of the conditions of the electrodes 10 by the control substrate 32 and the like can be easily displayed on the monitor 14. Moreover, since the electrode inspection device 1 can be directly connected to the industrial robot 15 through the robot connection portion 32c, transfer of signals such as an inspection start signal and an inspection end signal between the control substrate 32 and the industrial robot 15 can be directly performed between the control substrate 32 and the industrial robot 15. That is, in introducing the electrode inspection device 1 in a production line, connection among various devices can be easily made according to the use, which facilitates production line designing.

Further, since the fixing holes 21b provided on the measurement reference portions 21a make fixed the distance from the electrodes 10 fixed to the fixing holes 21b by way of the mirror 6 to the camera bodies 7, the measurement values do not readily vary. Moreover, since the mirror 6 enables the camera bodies 7 to take images of the tip-ends of the electrodes 10 from right in front, tip-end diameters in at least two directions can be measured at one time by processing the taken images by the control substrate 32. These enable the measurement of the tip-end diameters of the electrodes 10, that is, the measurement as to whether the tip-ends are perfect circles or not to be performed accurately with no reduction in the operating rate of the production line.

Moreover, by the mirror surfaces on both sides of the mirror 6 simultaneously reflecting the tip-ends of the electrodes 10, images of the tip-ends of the pair of electrodes 10 can be simultaneously taken, so that measurement of the tip-ends of the electrodes 10 can be performed with no reduction in the operating rate of the production line. Further, since the camera bodies 7 are not disposed between the tip-ends of the pair of electrodes 10 and only the mirror 6 is disposed, the distance between the electrodes 10 in the camera unit 2 can be decreased, so that the structure of the camera unit 2 can be made compact.

While images of the tip-end surfaces of a pair of electrodes 10 are taken by a pair of camera bodies 7 and processed in the embodiment of the present invention, a structure may be adopted in which an image of the tip-end of one electrode 10 is taken by one camera body 7 and processed.

While the control unit 3 is attached to the base 11 made of a metal material in the embodiment of the present invention, it may be attached to a different part; for example, it may be attached to different equipment made of a metal material.

While the control substrate 32 is provided with the network connection portion 32a, the monitor connection portion 32b and the robot connection portion 32c in the embodiment of the present invention, the present invention is not limited thereto; it is necessary only that at least one of the network connection portion 32a, the monitor connection portion 32b and the robot connection portion 32c be provided.

INDUSTRIAL APPLICABILITY

The present invention is suitable for a spot-welding electrode inspection device used, for example, in automotive production lines.

DESCRIPTION OF REFERENCE CHARACTERS

1 Spot-welding electrode inspection device
2 Camera unit
3 Control unit
4 Camera cable
6 Mirror
7 Camera body
10 Electrode
11 Base (mount member)
12 Network cable
13 Personal computer
14 Monitor
15 Industrial robot
21a Measurement reference portion
21b Fixing hole
31 Casing
32 Control substrate
32a Network connection portion
32b Monitor connection portion
32c Robot connection portion

The invention claimed is:

1. A spot-welding electrode inspection device comprising:
a camera unit including a camera body for taking an image of a tip-end of a spot-welding electrode mounted and held on a welding gun;
a control unit for controlling the camera unit; and
a camera cable having one end thereof connected to the camera unit and the other end thereof connected to the control unit,
wherein the control unit is provided with: a control substrate comprising a single-board computer including a network connection portion, the single-board computer for processing the image taken by the camera body and determining the condition of the electrode by comparing a processing result of the image with a setting value which is set in advance; and a metal casing housing the control substrate and attached to a mount member made of a metal material.

2. The spot-welding electrode inspection device according to claim 1,
wherein the network connection portion is at least one of connectable with a network cable and capable of transmitting and receiving a signal to and from a personal computer connected through the network cable, connectable with a monitor and capable of transmitting a signal to the monitor, and connectable with an industrial robot to an arm tip-end of which the welding gun is fixed, and capable of transmitting and receiving a signal to and from the robot.

3. The spot-welding electrode inspection device according to claim 1,
wherein a pair of the electrodes are provided so as to sandwich the camera unit,
the camera unit is provided with: a measurement reference portion where a pair of fixing holes are formed into which tip-end sides of the electrodes are inserted to fix the electrodes, respectively; and
a plate-like mirror disposed so as to be inclined with respect to the electrodes between the pair of fixing holes, and having, on both sides, mirror surfaces that reflect the tip-ends of the electrodes in a state of being fixed to the fixing holes, respectively, and
a pair of the camera bodies are disposed so that they can take images of the mirror surfaces of the mirror on both sides of the mirror and in a direction orthogonal to a direction in which the fixing holes are juxtaposed.

4. The spot-welding electrode inspection device according to claim 2,
wherein a pair of the electrodes are provided so as to sandwich the camera unit,
the camera unit is provided with: a measurement reference portion where a pair of fixing holes are formed into which tip-end sides of the electrodes are inserted to fix the electrodes, respectively; and
a plate-like mirror disposed so as to be inclined with respect to the electrodes between the pair of fixing holes, and having, on both sides, mirror surfaces that reflect the tip-ends of the electrodes in a state of being fixed to the fixing holes, respectively, and
a pair of the camera bodies are disposed so that they can take images of the mirror surfaces of the mirror on both sides of the mirror and in a direction orthogonal to a direction in which the fixing holes are juxtaposed.

* * * * *